United States Patent
Sit et al.

(10) Patent No.: US 7,401,321 B2
(45) Date of Patent: Jul. 15, 2008

(54) METHOD AND APPARATUS FOR PROCESSING INFORMATION ON SOFTWARE DEFECTS DURING COMPUTER SOFTWARE DEVELOPMENT

(75) Inventors: Steven Sit, San Jose, CA (US); Daniel DeKimpe, La Selva Beach, CA (US); Tamuyen Phung, Salinas, CA (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 10/413,240

(22) Filed: Apr. 14, 2003

(65) Prior Publication Data

US 2004/0205727 A1 Oct. 14, 2004

(51) Int. Cl.
*G06F 9/44* (2006.01)
(52) U.S. Cl. .................... 717/125; 717/105
(58) Field of Classification Search ............... 717/128, 717/125, 100, 105; 709/223; 715/503; 707/3
See application file for complete search history.

(56) References Cited

U.S. PATENT DOCUMENTS

| | | | |
|---|---|---|---|
| 5,978,788 A | 11/1999 | Castelli et al. | |
| 6,094,651 A | 7/2000 | Agrawal et al. | |
| 6,615,258 B1 * | 9/2003 | Barry et al. | 709/223 |
| 6,684,207 B1 * | 1/2004 | Greenfield et al. | 707/3 |
| 6,704,015 B1 * | 3/2004 | Bovarnick et al. | 345/440.2 |
| 6,721,941 B1 * | 4/2004 | Morshed et al. | 717/127 |
| 6,988,241 B1 * | 1/2006 | Guttman et al. | 715/503 |
| 2002/0049962 A1 * | 4/2002 | Kelbaugh et al. | 717/128 |
| 2002/0091707 A1 | 7/2002 | Keller | |

OTHER PUBLICATIONS

"IBM DB2 OLAP Server", product datasheet, published Mar. 2002 (4 pages). [Online] [Retrieved at] <www-900.ibm.com/cn/software/db2/products/download/datasheet/db2olap.pdf>.*
"DB2 OLAP Server—Theory and Practices", IBM Redbooks, Apr. 2001 (286 pages). [Online] [Retrieved at] <publib-b.boulder.ibm.com/abstracts/sg246138.html>.*
Aurora Version V1.0—Multidimensional Metadata—Functional and Design Specification; Draft V7; Jun. 17, 2002; Aurora Development Team; IBM SVL Lab; Aurora 1.0 Functional Specification; 36 pages.

* cited by examiner

*Primary Examiner*—Tuan Q. Dam
*Assistant Examiner*—Thuy Dao
(74) *Attorney, Agent, or Firm*—Rankin, Hill & Clark LLP

(57) ABSTRACT

An apparatus for processing data relating to software defects operates within an on-line analytical processing environment that includes an on-line analytical processing presentation tool (60). An on-line analytical processing cube model builder (32) builds a plurality of interrelated tables (22) with on-line analytical processing cube model metadata (30). The cube model (30) is configured to be processed by the associated on-line analytical processing presentation tool (60). A data extraction tool (36) communicates with a defect tracking database (10, 12) containing said data relating to software defects. The data extraction tool (36) extracts said data from the defect tracking database (10, 12), transforms the extracted data into the software defect entries, and loads the software defect entries into the tables (22).

42 Claims, 5 Drawing Sheets

FIG 4

METHOD AND APPARATUS FOR PROCESSING INFORMATION ON SOFTWARE DEFECTS DURING COMPUTER SOFTWARE DEVELOPMENT

BACKGROUND OF THE INVENTION

1. Field of the Invention

The present invention relates to the art of computer software development. It finds particular application in tracking and analyzing identified software defects in large commercial, business, and military software development projects, and will be described with particular reference thereto. However, the invention also finds application in analysis of smaller scale software development projects, in analysis of defects in other types of computer system developments such as, for example, an installation of a complex distributed database system for a nationwide or global business concern.

2. Description of Related Art

Modern computer software development projects are highly complex undertakings that involve teams of software developers each working on selected software components or modules destined to be combined to form the final software product. Quality control groups test modules, interactions between modules, interactions between modules and the supporting operating system, and so forth using hardware testbeds to identify software defects during the development. Project engineers coordinate the workflow, forecast project timelines, and otherwise manage project activities.

Software defects inevitably are introduced during development of large, complex software products. Resolution of defects in complex software development projects is a difficult task due, among other reasons, to a high degree of interrelatedness of various software components. Resolution of one identified defect can give rise to other defects. Such defect interaction is reduced but not eliminated through the use of modular programming concepts.

Quality control groups test software modules to identify and characterize software defects. When a defect is identified, information pertaining to the defect is recorded in a database, and the associated software module or modules are tested to identify characteristics of the defect such as the scope of affected software components, the software versions or releases which exhibit the defect, operating conditions under which the defect manifests, severity of the defect, and so forth. The identified defect information is forwarded to a software development team which is assigned the task of remedying the defect.

In a complex software project, defects are discovered and subsequently resolved on a continuing basis, and it is useful to maintain accurate, up-to-date records and statistics pertaining to the discovered software defects. For example, a decrease in a rate of newly discovered defects in a component over time is typically indicative of increasing robustness and reliability of that component, and is thus an indicator that good progress is being made. Conversely, an increasing rate of newly discovered defects, or a large time interval between discovery and resolution of severe defects, can be indicative of substantial problems with the associated software component or components.

In the past, data pertaining to software defects has been stored and tracked using dedicated source control or defect tracking systems that are optimized to provide an efficient defect remediation workflow. In these systems, each defect is typically classified based on its severity, assigned a resolution priority based on its impact on software performance, and assigned to a software developer or development team for resolution. A defect status is stored in a relational database or other storage entity, and is monitored and tracked until the defect is remedied. After remediation is complete, the defect information is preferably retained for statistical defect analyses or other purposes.

Existing defect tracking systems are suitable for managing remediation of specific defects, but provide limited information relevant to workflow coordination and forecasting for the software development project as a whole. Information for high-level management tasks come in various data formats and from various sources. Project engineers study incoming defect rates, risk factors associated with defects, defect resolution rates, and the like in order to generate development timeline projections, to allocate development resources, to identify problematic software components, and so forth.

Existing defect tracking systems that are targeted toward efficient defect remediation workflow typically do not provide information on defects in a form that is readily applied to these high level project engineering tasks. Moreover, information contained in these defect tracking systems is not readily integrated with other types of information related to project development. Project engineers would benefit from a system, apparatus, method, or article of manufacture for integrating information on software defects with other types of information, and for arranging such integrated data compilations in a format that is supportive of high level project development tasks. Preferably, such a system, apparatus, method, or article of manufacture would be compatible with existing data analysis tools that are familiar to typical software project engineers, such as commercial spreadsheet programs that provide tabular and graphical representations of data compilations.

The present invention contemplates an improved method and apparatus which overcomes these limitations and others.

SUMMARY OF THE INVENTION

In accordance with one aspect, an apparatus is disclosed for processing data relating to software defects. The apparatus is operative within an associated on-line analytical processing environment that includes at least an on-line analytical processing presentation tool for presenting results of on-line analytical processing. An on-line analytical processing cube model builder builds a plurality of interrelated tables with on-line analytical processing cube model metadata. The tables include at least a defects fact table containing software defects entries corresponding to said data relating to software defects and a plurality of dimension tables. The cube model is configured to be processed by the associated on-line analytical processing presentation tool. A data extraction tool communicates with a defect tracking database containing said data relating to software defects. The data extraction tool extracts said data from the defect tracking database, transforms the extracted data into the software defect entries, and loads the software defect entries into the defects fact table.

In accordance with another aspect, a method is provided for processing data on software defects identified during software development. Information pertaining to identified software defects is formatted and loaded as defect entries into a defects database. A multidimensional on-line analytical processing cube model associated with the defects database is constructed. The cube model includes at least a plurality of time dimensions. An on-line analytical processing cube is constructed based on the defects database, the cube model, and a selection of cube dimensions. The on-line analytical processing cube is accessed using an on-line analytical processing presentation tool.

In accordance with yet another aspect, an article of manufacture is disclosed comprising a program storage medium readable by a computer and embodying one or more instructions executable by the computer to perform a method for processing data on identified software defects. An on-line analytical processing cube containing information pertaining to identified software defects is generated. The on-line analytical processing cube is accessed using an on-line analytical processing presentation tool.

Numerous advantages and benefits of the invention will become apparent to those of ordinary skill in the art upon reading and understanding this specification.

BRIEF DESCRIPTION OF THE DRAWINGS

The invention may take form in various components and arrangements of components, and in various process operations and arrangements of process operations. The drawings are only for the purposes of illustrating preferred embodiments and are not to be construed as limiting the invention.

Figure 4:
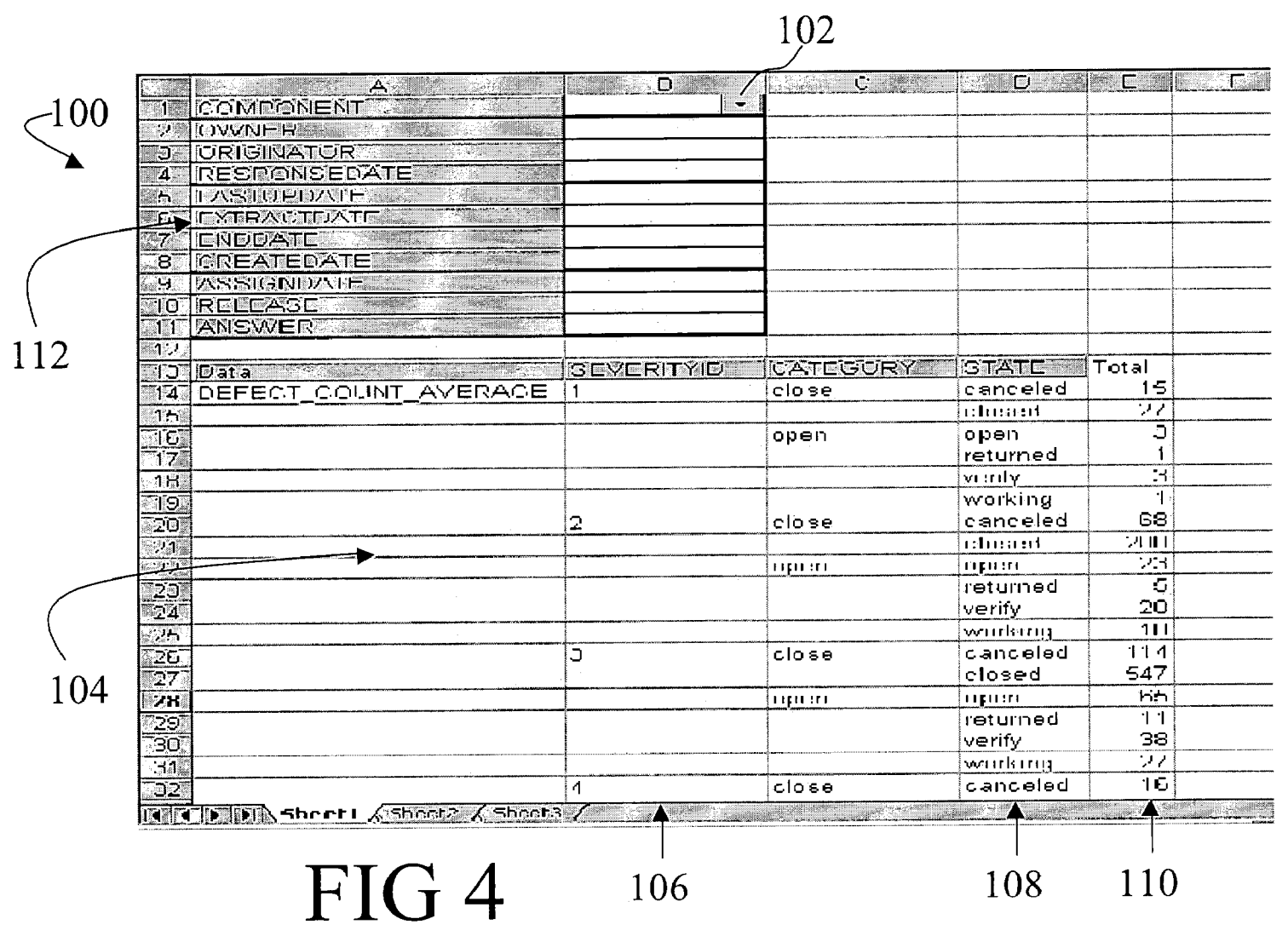

FIG. 4 shows an exemplary screenshot of a defects analysis performed using the spreadsheet with add-in OLAP presentation tool of the analysis system of FIG. 1.

DETAILED DESCRIPTION OF THE PREFERRED EMBODIMENTS

Figure 1:
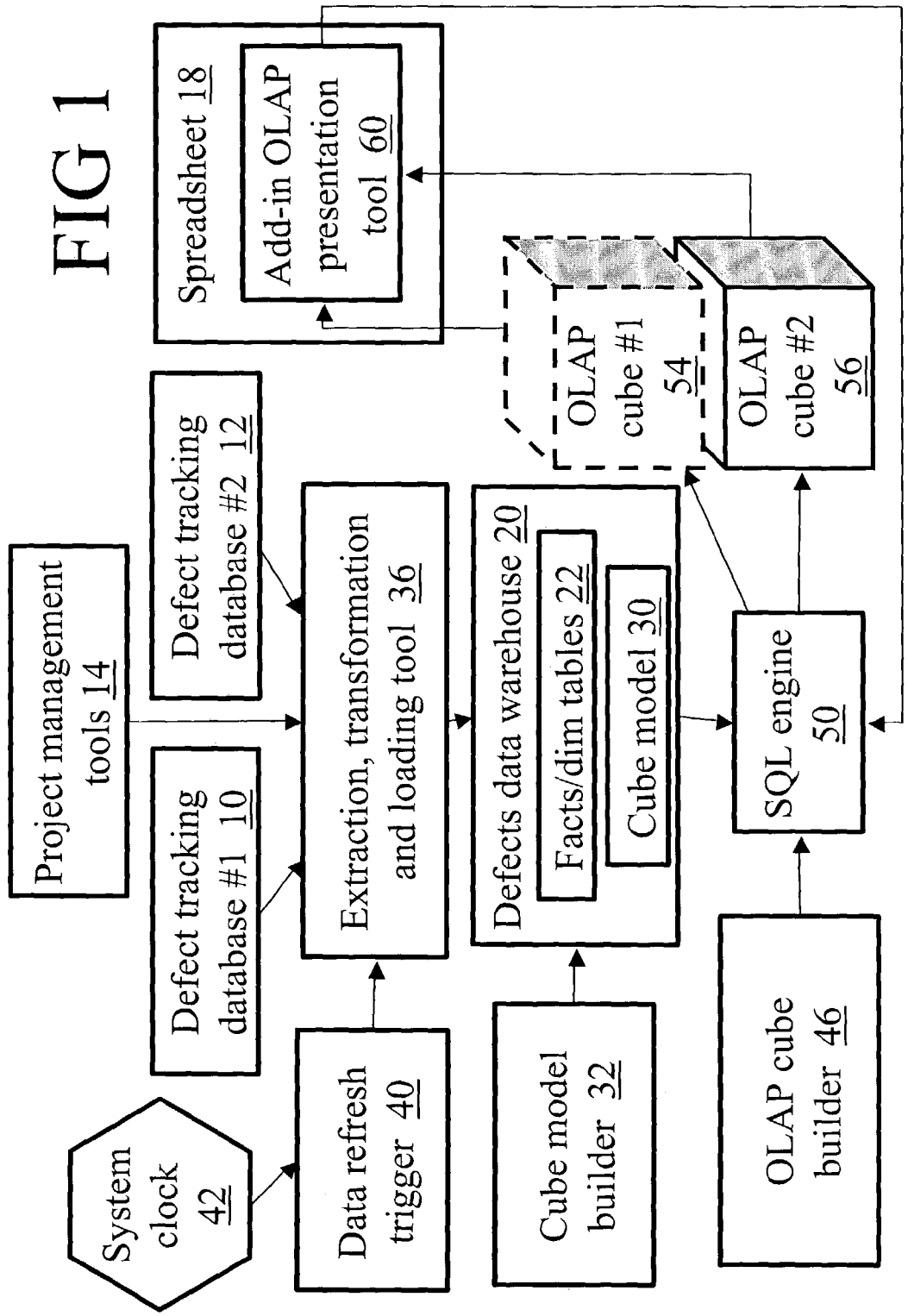
FIG. 1 shows a block diagram of the software defects analysis system.

With reference to FIG. 1, one or more defect tracking databases 10, 12 contain information on software defects of a software development effort. The information in the defect tracking databases 10, 12 is entered by quality control teams, development teams, or other entities that discover and characterize the software defects. The databases 10, 12 are typically relational databases, but can be substantially any type of information storage entity. In a typical embodiment, the databases 10, 12 store, for each identified defect, information such as: a component name identifying which software component apparently contains the defect; defect originator information pertaining to who identified the defect; defect owner information pertaining to who is responsible for remedying the defect; a defect severity indicator; a defect state such as opened, closed, working, verified, or the like; dating information such as a creation date indicating when information on the defect was first recorded, an assignment date specifying when the defect owner was assigned the defect, and a last-modified date indicating when the defect entry was last updated; a defect abstract that includes a textual summarization of defect characteristics; release information pertaining to which version or release of the software contains the defect; and so forth.

The defect tracking databases 10, 12 generally employ a proprietary or non-standard storage format, and provide limited analysis capabilities. The databases 10, 12 are also typically incompatible with other information sources such as project management tools 14, and are not directly readable by general-purpose data analysis and display packages such as a conventional spreadsheet program 18. The defect tracking databases 10, 12 do not provide flexible analysis capabilities such as are desired by project engineers and other high level software development project personnel.

To provide flexible on-line analytical processing (OLAP) capabilities appropriate for high level software development tasks, a data warehouse database 20 includes interrelated tables 22 and metadata defining a cube model 30 that represents a structural relationship between the tables 22. The cube model 30 is an on-line analytical processing metadata object which represents a structural relationship among tables and table columns in a relational database. The metadata defining the cube model 30 is based on a suitable entity relationship schema for interrelating the tables 22, such as a star schema or a snowflake schema, that relates relational database tables containing data and metadata pertaining to the defects. The warehouse defect database 20 with metadata defining the cube model 30 can be selectively processed using structured query language (SQL) commands to generate OLAP cubes having selected dimensions and dimensional hierarchies for further analysis.

A cube model builder 32 constructs the warehouse defect database 20 with exemplary star schema tables 22, table joins, and the OLAP metadata with dimensional information, and other structural aspects of the defects cube model 30 within a relational database environment. In a suitable embodiment, the cube model 30 is built within a DB2 relational database environment (available from IBM Corporation). However, other database environments can also be used.

The constructed warehouse defects database 20 is loaded with information on defects contained in the defect tracking databases 10, 12 by an extraction, transformation, and loading (ETL) tool 36. Because the defect tracking databases 10, 12 typically employ non-standard data formatting, the ETL tool 36 is preferably a customized software tool, for example a C++ program or program suite, that is designed to operate on data having the specific format of the defect tracking databases 10, 12. Although two defect tracking databases 10, 12 are shown as being processed by the ETL tool 36 in FIG. 1, it will be appreciated that only a single defect tracking database, or more than two defect tracking databases, can similarly be processed by the ETL tool 36. Moreover, the ETL tool 36 preferably loads additional information pertaining to software defects form other sources, such as from the project management tools 14. For example, the project management tools 14 may store information on allocation of software development resources such as hardware testbeds, or information on estimated progress in resolution of identified defects.

After the initial creation and loading of the warehouse defect database 20, the contents are occasionally refreshed so that the warehouse database 20 including metadata of the cube model 30 contains substantially up-to-date information on identified software defects. In a suitable refresh method, a data refresh trigger 40 references a system clock 42 to trigger the ETL tool 36 to perform a contents update of the warehouse database 20 on a daily or other selected periodic time interval.

The defects metadata cube model 30 provides a suitable framework for performing OLAP analyses of the defects data. In an exemplary arrangement shown in FIG. 1, an OLAP cube builder 46 generates one or more SQL statements that are processed by an SQL engine 50 to effect generation of one or more OLAP cubes 54, 56 based on the cube model 30 that each have selected dimensions and dimensional hierarchies. In the illustrated embodiment of FIG. 1, the OLAP cube 54 is a virtual object that is logically defined by selection of dimensions and dimensional hierarchies of the cube model 30. This virtual nature of the OLAP cube 54 is indicated by showing the cube 54 using dashed lines. The virtual cube 54 advantageously uses limited memory; however processes employing the cube 54 can be slowed down by additional processing employed to extract data during analyses using the virtual cube 54.

On the other hand, the OLAP cube 56 is fully instantiated; that is, the cube 56 exists in a separate random access memory and/or disk space from the cube model 30, the separate space being configured in conformance with the cube dimensions selected for the cube 56. The fully instantiated nature of the OLAP cube 56 is indicated by showing the cube 56 using solid lines. The fully instantiated cube 56 occupies more memory an equivalent virtual cube; however, processing using the fully instantiated cube 56 is typically faster than equivalent processing employing an equivalent virtual cube. OLAP cubes preferably can also be generated by the OLAP cube builder 46 which are partially instantiated and partially virtual. Those skilled in the art can optimize between virtual and instantiated cubes to make efficient use of available disk and random access memory space while achieving a desired analysis processing speed.

The OLAP cubes 54, 56 are accessed by an end user operating an OLAP presentation tool 60. In the exemplary embodiment of FIG. 1, the end user operates the spreadsheet program 18 that includes the OLAP presentation tool 60 as an add-in program, such as a spreadsheet plug-in program, to slice, dice, and drill through the cube to data, plot selected slices of cube data, or otherwise analyze data stored in the cubes 54, 56.

The present invention is typically implemented using one or more computer programs, each of which executes under the control of an operating system, such as IBM OS/2, Microsoft Windows, DOS, etc. IBM-AIX, UNIX, LINUX, and other operating systems and causes one or more computers to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thus making a computer program product or article of manufacture according to the invention. As such, the term "article of manufacture" as used herein are intended to encompass a computer program accessible from any computer readable device or media.

Furthermore, the computer programs and operating system are comprised of instructions which, when read and executed by one or more computers cause the one or more computers to perform process operations necessary to implement and/or use the present invention. Under control of the operating system, the computer programs may be loaded from the memory, data storage devices, and/or data communications devices into the memories of one or more computers for use during actual operations. Those skilled in the art will recognize many modifications may be made to this configuration without departing from the scope of the present invention.

Moreover, the illustrated defect processing system shown in FIG. 1 is exemplary only. Those skilled in the art can readily modify the arrangement and/or interrelation of components to adapt the defect processing system to specific defect information sources, OLAP engines, and OLAP presentation software configurations. For example, the OLAP cube builder 46 is optionally integrated into the add-in OLAP presentation tool 60, so that the presentation tool component 60 of the spreadsheet program 18 directly constructs the OLAP cubes 54, 56 for navigation by an end user operating the spreadsheet program 18. Alternatively, the OLAP cube builder 46 can be integrated into the SQL engine 50. Those skilled in the art can readily make other modifications to the exemplary embodiment of FIG. 1. For instance, the data refresh trigger 40 can be integrated into the ETL tool 36.

The cube model builder 32 preferably constructs the metadata cube model 30 to conform with a standardized general purpose metadata specification. Further, the OLAP cube builder 46 and the OLAP presentation tool 60 are preferably configured to read and process metadata formatted in accordance with the standardized general purpose metadata specification. In this arrangement, the OLAP cube builder 46 and the OLAP presentation tool 60 are advantageously standardized products rather than customized components. However, it is also contemplated to employ a non-standard metadata format for the metadata cube model 30, in which case the OLAP cube builder 46 and the OLAP presentation tool 60 are suitably modified or configured to read and process the non-standard metadata format.

Figure 2:
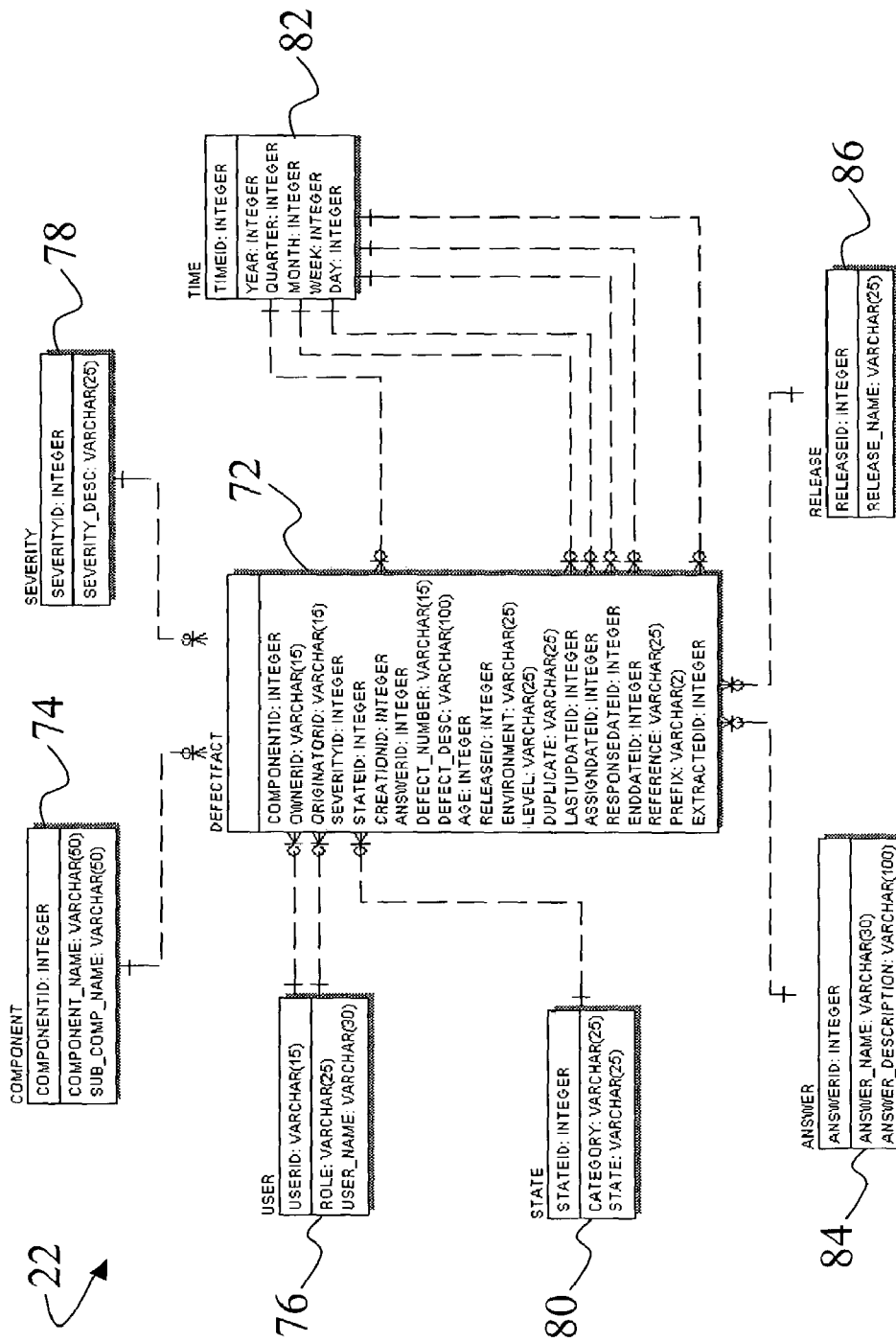
FIG. 2 diagrammatically shows a star schema used for constructing a data warehouse for storing data on software defects with an on-line analytical processing metadata cube model.

With reference to FIG. 2, a preferred embodiment of the interrelated tables 22 is described. The tables 22 have an entity relationship corresponding to an exemplary star schema topology. However, a snowflake schema or other schema can be substituted for the star schema topology. A defects facts table 72 has a plurality of columns for each defect entry row. A plurality of dimension tables 74, 76, 78, 80, 82, 84, 86 are joined to the defects facts table 72 by a primary key column of the dimension table that corresponds with one or more foreign key columns of the defect facts table 72.

In the exemplary illustrated embodiment of FIG. 2, the columns of the defects facts table 72 include a COMPONENTID which identifies the software component in which the defect was detected. COMPONENTID stores a foreign key joining to the COMPONENT dimension table 74. OWNERID identifies the defect owner, while ORIGINATORID identifies the defect originator. These columns of the facts table 72 store foreign keys that join to the USER dimension table 76. SEVERITYID contains a defect severity level indicator, and stores a foreign key that joins to the SEVERITY dimension table 78. STATEID contains a defect state (for example, opened, closed, being verified, etc.), and stores a foreign key that joins to the STATE dimension table 80.

Several time columns CREATIONID, LASTUPDATEID, ASSIGNDATEID, RESPONSEDATEID, and ENDDATEID contain a defect entry creation date, a date of last entry update, a date of owner assignment, a date the owner accepted or returned the defect, and a date that the defect was closed or canceled, respectively. These columns store foreign keys that join to the TIME dimension table 82. These columns provide information about when events happened to a defect such as being opened or closed.

The column EXTRACTEDID contains a date that the defect entry contents were last extracted by the ETL tool 36. This column also stores a foreign key that joins to the TIME dimension table 82. In a preferred embodiment, whenever the ETL tool 36 extracts data on a defect, a new row is created in the facts table 72 which contains information that is current as of the extract date for that defect. The EXTRACTEDID identifies the extraction date for each row of the facts table 72 so that a snapshot of the defect data is recorded and stored each time the ETL tool 36 performs an update. EXTRACTEDID is used to identify the state of a defect at a point in time, by tagging the extracted data with the extract date. This enables a detailed analysis or snapshot of defects at a selected time in the past, e.g. one month ago.

ANSWERID is used by the defect owner to accept or return the defect, and stores a foreign key that joins to the ANSWER dimension table 84. DEFECT_NUMBER contains a unique identification number or name for the defect entry. DEFECT_DESC which contains a textual abstract or summarization of the defect. AGE contains an age of the defect starting from the creation date to a current date. RELEASEID contains an identification of the software release or version containing the defect, and stores a foreign key that joins to the RELEASE dimension table 86. ENVIRONMENT identifies the operating system or other environmental information in which the defect manifested. LEVEL specifies the level in which the defect manifested. DUPLICATE is used to indicate a duplicate defect entry row. REFERENCE stores a reference name or handle for the defect. PREFIX which contains a defect type code.

Table I provides a summary of the tables 72, 74, 76, 78, 80, 82, 84, 86 of the exemplary star schema interrelated tables 22.

TABLE 1

Description of Tables of the Star Schema

| Table | Description |
|---|---|
| Component | The COMPONENT table shows the component name and its sub-component name. The integer primary key from Component table is referenced as a foreign key in DEFECTFACT table. |
| Severity | The Severity table has Severityid and Severity description that describes the problem of the defect. The integer primary key from Severity table is referenced as a foreign key in DEFECTFACT table. |
| User | The User table contains a list of originator name and owner name with Role as the higher category. Its primary key is varchar datatype and it physically joins the Originatorid and Ownerid (as the foreign key) from the DEFECTFACT table. |
| State | The State table shows the status of the defect. The higher category column is grouped in either Open or Close category. The Open category (open, working, returned, and verify) and the Close category (closed, canceled) are grouped respectably. Its integer primary key is referenced as a foreign key in DEFECTFACT table. |
| Answer | The Answer table shows the answer name and the answer description of the defect especially when the defect is either accepted or returned from the owner. Its integer primary key is referenced as a foreign key in DEFECTFACT table. |
| Release | The Release table contains the Releaseid and Release name. Its integer primary key is referenced as a foreign key in DEFECTFACT table. |
| Time | The Time table defines the time period for which we report and update data. The Time dimension references several dimensions such as: AssignDate, CreateDate, EndDate, ExtractDate, LastUpdate, and ResponseDate. |
| DefectFact | The DefectFact table contains the foreign keys columns from the dimension tables and others columns that are used in the defect model. |

It will be appreciated that different or other information pertaining to software defects can be similarly incorporated into the multidimensional defects metadata cube model. For example, an allocation of each defect to a software quality control hardware testbed can be included. This information is typically stored in the project management tools 14, and is useful in OLAP analyses for determining optimal allocation of defects among the available hardware testbeds. Similarly, an estimate of the progress toward remedying the defect, quantified for example as a percentage completion of defect remediation, can similarly be extracted from the project management tools 14 by the ETL tool 36.

In addition to metadata pertaining to the interrelationship of the tables 22, the metadata of the cube model 30 includes other on-line analytical processing metadata objects such as measure objects. Each measure object defines a measurement entity that is operative in conjunction with a dimensional context. In a preferred embodiment, two measures are provided: a Defect_Count measure and a Defect_Count_Average measure. These exemplary measures are described below.

The Defect_Count measure is defined as a constant value of 1. Its aggregation function is set as COUNT and it maps to the AGE column in the DefectFact table 72. An exemplary Defect_Count measure of the defect cube model 30 is defined in XML below:

```
- <measure name="DEFECT_COUNT" schema="DEFECT"
  BusinessName="DEFECT_COUNT" createTime=
  "2003-02-20T17:09:21" creator="ARBOR"
  modifyTime="2003-02-20T17:11:53" modifier="ARBOR">
     <datatype schema="SYSIBM" name="INTEGER" length="4"
     scale="0" />
   - <sqlExpression template="{$$1}">
       <column name="AGE" tableSchema="DEFECT" tableName=
       "DEFECTFACT" />
     </sqlExpression>
       <aggregation function="COUNT" />
     </measure>
``` where tableSchema="DEFECT" references the interrelated tables 22 of FIG. 2 and tableName=DEFECTFACT references the fact table 72.

The Defect_Count_Average measure is suitably defined as an average value of the total defect count. Its aggregation function is calculated by averaging based on the ExtractDate column in the DefectFact table 72. A suitable Defect_Count_Average measure in the defect cube model 30 is defined in XML below:

```
- <measure name="DEFECT_COUNT_AVERAGE" schema=
  "DEFECT"
  businessName="DEFECT_COUNT_AVERAGE" createTime=
  "2003-02-20T17:09:21"
  creator="ARBOR" modifyTime="2003-03-11T17:49:40" modifier=
  "ARBOR">
     <datatype schema="SYSIBM" name="INTEGER" length=
     "4" scale="0" />
     <sqlExpression template="1" />
 - <aggregation function="COUNT">
     <dimensionRef name="ANSWER" schema="DEFECT" />
     <dimensionRef name="ASSIGNDATE" schema="DEFECT" />
     <dimensionRef name="CREATEDATE" schema="DEFECT" />
     <dimensionRef name="DUPLICATE" schema="DEFECT" />
     <dimensionRef name="ENDDATE" schema="DEFECT" />
     <dimensionRef name="ENVIRONMENT" schema="DEFECT" />
     <dimensionRef name="LASTUPDATE" schema="DEFECT" />
     <dimensionRef name="LEVEL" schema="DEFECT" />
     <dimensionRef name="ORIGINATOR" schema="DEFECT" />
     <dimensionRef name="OWNER" schema="DEFECT" />
     <dimensionRef name="PREFIX" schema="DEFECT" />
     <dimensionRef name="REFERENCE" schema="DEFECT" />
     <dimensionRef name="RELEASE" schema="DEFECT" />
     <dimensionRef name="RESPONSEDATE" schema="DEFECT" />
     <dimensionRef name="SEVERITY" schema="DEFECT" />
     <dimensionRef name="STATE" schema="DEFECT" />
   </aggregation>
   <aggregation function="AVG" />
 </measure>
``` where schema="DEFECT" references the interrelated tables 22 of FIG. 2 and the various dimensionRef names reference columns of the fact table 72. Aggregation function="AVG" defines the aggregation function as a statistical averaging.

The Defect_Count and Defect_Count_Average measures are exemplary only. Those skilled in the art can readily incorporate other measures into the multidimensional defects metadata cube model 30. For example, a base level Estimated_Duration measure can be included to track the duration of remedying a defect. An extra column Duration is suitably added to the facts table 72. Task duration data is typically stored in the Project Management tools 14, and can be extracted, formatted, and loaded into the facts table 72 by the ETL tool 36. The Estimated_Duration measure can be rolled up using a SUM aggregation function along all dimensions. For example, an end user can get information such as the total number of days to close all defects of a particular component having a severity equal to 1.

A base level measure Days_Completed is optionally incorporated to track the completion status of defects in terms of days. Typically, the project management tools 14 track a percentage of completion of each task. This percentage completion data is extracted by the ETL tool 36 and stored in an added Percentage_Complete column of the Fact table 72. The measure Days_Completed is computed by the following expression:

$$\text{Days\_Completed} = (\text{Percentage\_Complete}/100) \times \text{Estimated\_Duration} \quad (1)$$

where Percentage_Complete is the contents of the additional column of the facts table 72, and the Estimated_Duration measure was defined previously.

Another derived measure, Task_Completion, is optionally created using the following expression:

$$\text{Task\_Completion} = \text{Days\_Completed}/\text{Estimated\_Duration} \times 100\% \quad (2).$$

A suitable aggregation function of Task_Completion is given by:

$$\text{SUM}(\text{Days\_Completed})/\text{SUM}(\text{Estimated\_Duration}) \times 100\% \quad (3).$$

The Days_Completed measure is an intermediate measure with the SUM aggregation function. Estimated_Duration is also a fully additive measure with the SUM aggregation functions. The value of measure Task_Completion is calculated using the aggregated value of Days_Completed and Estimated_Duration.

Yet another derived measure, a Remaining_Effort_in_Days measure, is optionally incorporated to show an end user an overall status of the defect remediation efforts. This measure is suitably computed according to:

$$\text{Remaining\_Effort\_in\_Days} = \text{Estimated\_Duration} - \text{Days\_Completed} \quad (4).$$

Still yet another derived measure, Defect_Count_by_Week, is optionally incorporated to represent a number of defects at the end of the week. In order to enable this measure, an extra column is suitably added to the Time dimension table 82, namely a "Last_Day_of_Week" column, which stores a binary value indicating whether a day is a last day of a week. For example, a value of 1 can be used to indicate a last day of a week, while a value of 0 is used for the other six days of each week. The measure is then defined as:

$$\text{Defect\_Count\_by\_Week} = \text{Defect\_Count} \times \text{Last\_Day\_of\_Week} \quad (5).$$

Derived measures indicating the defect count by Month, Quarter, or other time interval can be similarly constructed.

The described measures are exemplary only. Those skilled in the art can readily incorporate different or other measures into the multidimensional defects metadata cube model 30 in similar fashion.

The metadata of the cube model 30 further includes dimension objects. A dimension object provides a way to categorize a set of related attributes that together describe one aspect of a measure. Dimensions are used in the cube model 30 to organize the calculated data according to logical categories such as Severity, Priority, or Time. Related attributes and the joins for grouping attributes together are defined in the dimension's object specific definition properties. Dimensions reference one or more hierarchies. Hierarchies describe the relationship and structure of the dimensional attributes and can be used to drive navigation and calculation of the dimension.

The exemplary cube model 30 includes eighteen dimensions and hierarchies, which are set forth below.

1. ANSWER Dimension:
   Attributes: ANSWERID, ANSWER_NAME, ANSWER_DESCRIPTION
      Hierarchies name: ANSWER_H
         Hierarchies Attributes: ANSWER_NAME, ANSWER_DESCRIPTION
2. RELEASE Dimension:
   Attributes: RELEASEID, RELEASE_NAME
      Hierarchies name: RELEASE_H
         Hierarchies Attributes: RELEASEID, RELEASE_NAME
3. SEVERITY Dimension:
   Attributes: SEVERITYID, SEVERITY_DESC
      Hierarchies name: RELEASE_H
         Hierarchies Attributes: SEVERITYID, SEVERITY_DESC
4. STATE Dimension
   Attributes: STATEID, CATEGORY, STATE
      Hierarchies name: STATE_H
         Hierarchies Attributes: CATEGORY, STATE
5. ASSIGNDATE Dimension:
   Attributes: TIMEID, YEAR, QUARTER, MONTH, WEEK, DAY
      Hierarchies name: ASSIGNDATE_H
         Hierarchies Attributes: YEAR, QUARTER, MONTH, WEEK, DAY
6. CREATEDATE Dimension:
   Attributes: TIMEID, YEAR, QUARTER, MONTH, WEEK, DAY
      Hierarchies name: CREATEDATE_H
         Hierarchies Attributes: YEAR, QUARTER, MONTH, WEEK, DAY
7. ENDDATE Dimension:
   Attributes: TIMEID, YEAR, QUARTER, MONTH, WEEK, DAY
      Hierarchies name: ENDDATE_H
         Hierarchies Attributes: YEAR, QUARTER, MONTH, WEEK, DAY
8. EXTRACTDATE Dimension:
   Attributes: TIMEID, YEAR, QUARTER, MONTH, WEEK, DAY
      Hierarchies name: EXTRACTDATE_H
         Hierarchies Attributes: YEAR, QUARTER, MONTH, WEEK, DAY
9. LASTUPDATE Dimension:
   Attributes: TIMEID, YEAR, QUARTER, MONTH, WEEK, DAY Hierarchies name: LASTUPDATE_H
Hierarchies Attributes: YEAR, QUARTER, MONTH, WEEK, DAY
10. RESPONSEDATE Dimension:
Attributes: TIMEID, YEAR, QUARTER, MONTH, WEEK, DAY
Hierarchies name: RESPONSEDATE_H
Hierarchies Attributes: YEAR, QUARTER, MONTH, WEEK, DAY
11. ORIGINATOR Dimension:
Attributes: USERID, ROLE, USER_NAME
Hierarchies name: ORIGINATOR_H
Hierarchies Attributes: ROLE, USER_NAME
12. OWNER Dimension:
Attributes: USERID, ROLE, USER_NAME
Hierarchies name: OWNER_H
Hierarchies Attributes: ROLE, USER_NAME
13. COMPONENT Dimension:
Attributes: COMPONENTID, COMPONENT_CATEGORY, SUB_COMP_NAME, COMPONENT_NAME
Hierarchies name: COMPONENT_H
Hierarchies Attributes: COMPONENT_CATEGORY, COMPONENT_NAME, COMPONENT_NAME
14. ENVIRONMENT Dimension:
Attributes: EXTRACTEDID, DEFECT_NUMBER, ENVIRONMENT
Hierarchies name: ENVIRONMENT_H
Hierarchies Attributes: EXTRACTEDID, ENVIRONMENT
15. LEVEL Dimension:
Attributes: EXTRACTEDID, DEFECT_NUMBER, LEVEL
Hierarchies name: LEVEL_H
Hierarchies Attributes: EXTRACTEDID, LEVEL
16. DUPLICATE Dimension:
Attributes: EXTRACTEDID, DEFECT_NUMBER, DUPLICATE
Hierarchies name: DUPLICATE_H
Hierarchies Attributes: EXTRACTEDID, DUPLICATE
17. PREFIX Dimension:
Attributes: EXTRACTEDID, DEFECT_NUMBER, PREFIX
Hierarchies name: PREFIX_H
Hierarchies Attributes: EXTRACTEDID, PREFIX
18. REFERENCE Dimension:
Attributes: EXTRACTEDID, DEFECT_NUMBER, REFERENCE
Hierarchies name: PREFIX_H
Hierarchies Attributes: EXTRACTEDID, REFERENCE The above dimensions are exemplary only. Those skilled in the art can readily modify these exemplary dimensions, substitute other dimensions, add dimensions, remove dimensions, or otherwise modify the dimensional scheme of exemplary cube model 30. For example, dimensions can be added to indicate at what point the defect was identified, such as during development, during quality control testing, or after product release (e.g., a defect reported by a customer).

Figure 3:
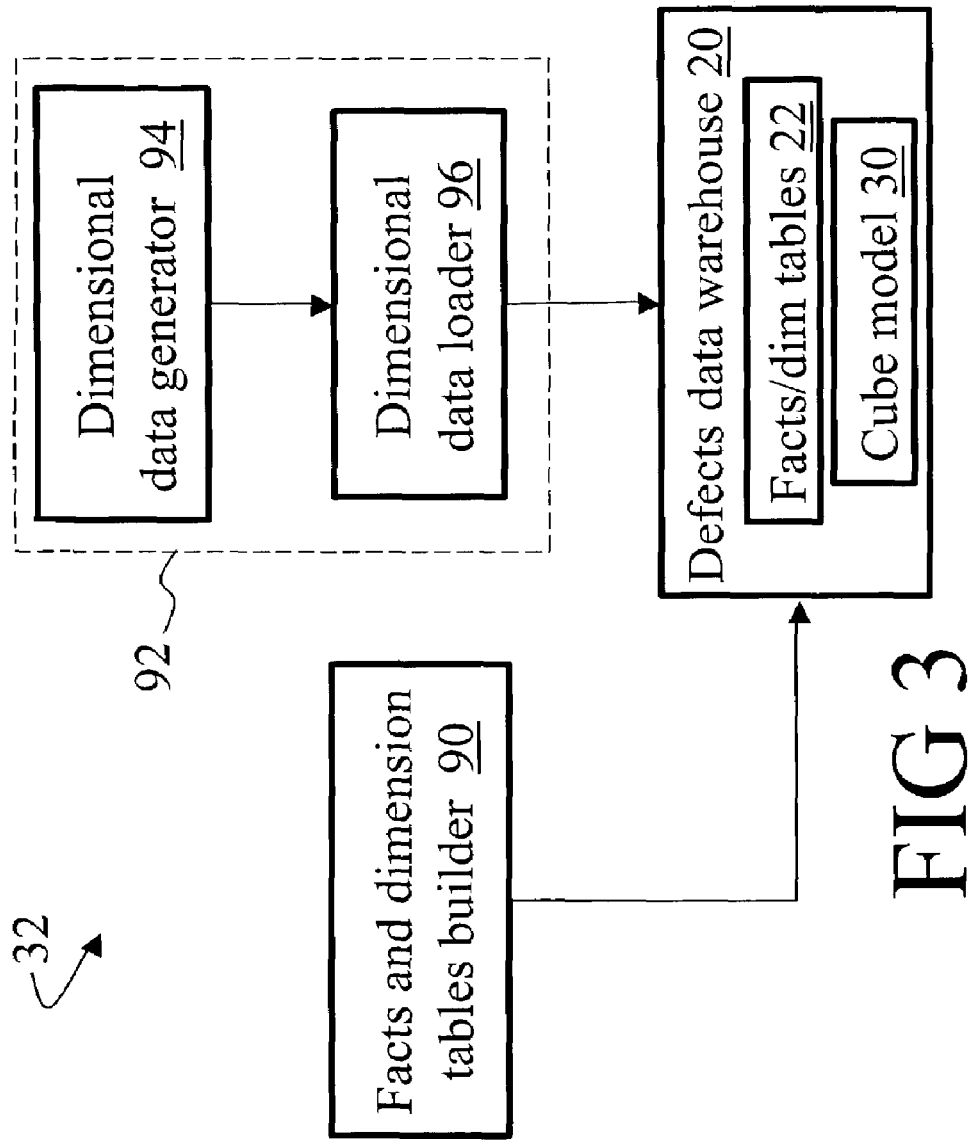
FIG. 3 shows a block diagram of the cube model builder component of the software defects analysis system of FIG. 1.

With reference to FIG. 3, the cube model builder 32 includes a facts and dimensions tables builder 90 that a builds the structure of the interrelated tables 22 including the facts table 72, dimension tables 74, 76, 78, 80, 82, 84, 86, and table joins. A suitable data definition language (DDL) script embodiment of the tables builder 90 for creating the interrelated tables 22 is set forth below:

```
SET CURRENT SCHEMA = DEFECT;
-- ====================================================
-- Drop DEFECT tables
-- ====================================================
DROP TABLE DEFECTFACT;
DROP TABLE TIME;
DROP TABLE COMPONENT;
DROP TABLE USER;
DROP TABLE SEVERITY;
DROP TABLE STATE;
DROP TABLE RELEASE;
DROP TABLE ANSWER;
-- ====================================================
-- Create DEFECT tables
-- ====================================================
CREATE TABLE TIME
( TIMEID            INTEGER         NOT NULL,
  YEAR              INTEGER         NOT NULL,
  QUARTER           INTEGER         NOT NULL,
  MONTH             INTEGER         NOT NULL,
  WEEK              INTEGER         NOT NULL,
  DAY               INTEGER         NOT NULL);
CREATE TABLE COMPONENT
( COMPONENTID       INTEGER         NOT NULL,
  COMPONENT_CATEGORY VARCHAR(20)    NOT NULL,
  COMPONENT_NAME    VARCHAR(50)     NOT NULL,
  SUB_COMP_NAME     VARCHAR(50)     NOT NULL);
CREATE TABLE USER
( USERID            VARCHAR(15)     NOT NULL,
  ROLE              VARCHAR(25)     NOT NULL,
  USER_NAME         VARCHAR(30)     NOT NULL);
CREATE TABLE SEVERITY
( SEVERITYID        INTEGER         NOT NULL,
  SEVERITY_DESC     VARCHAR(25)     NOT NULL);
CREATE TABLE STATE
( STATEID           INTEGER         NOT NULL,
  CATEGORY          VARCHAR(25)     NOT NULL,
  STATE             VARCHAR(25)     NOT NULL);
CREATE TABLE RELEASE
( RELEASEID         INTEGER         NOT NULL,
  RELEASE_NAME      VARCHAR(25)     NOT NULL);
CREATE TABLE ANSWER
( ANSWERID          INTEGER         NOT NULL,
  ANSWER_NAME       VARCHAR(30)     NOT NULL,
  ANSWER_DESCRIPTION VARCHAR(100)   NOT NULL);
CREATE TABLE DEFECTFACT
( COMPONENTID       INTEGER         NOT NULL,
  OWNERID           VARCHAR(15)     NOT NULL,
  ORIGINATORID      VARCHAR(15)     NOT NULL,
  SEVERITYID        INTEGER         NOT NULL,
  STATEID           INTEGER         NOT NULL,
  CREATIONID        INTEGER         NOT NULL,
  ANSWERID          INTEGER         NOT NULL,
  DEFECT_NUMBER     VARCHAR(15)     NOT NULL,
  DEFECT_DESC       VARCHAR(100)    NOT NULL,
  AGE               INTEGER         NOT NULL,
  RELEASEID         INTEGER         NOT NULL,
  ENVIRONMENT       VARCHAR(25)     NOT NULL,
  LEVEL             VARCHAR(25)     NOT NULL,
  DUPLICATE         VARCHAR(25)     NOT NULL,
  LASTUPDATEID      INTEGER         NOT NULL,
  ASSIGNDATEID      INTEGER         NOT NULL,
  RESPONSEDATEID    INTEGER         NOT NULL,
  ENDDATEID         INTEGER         NOT NULL,
  REFERENCE         VARCHAR(25)     NOT NULL,
  PREFIX            VARCHAR(2)      NOT NULL,
  EXTRACTEDID       INTEGER         NOT NULL);
-- ====================================================
-- Create Primary Keys on DEFECT tables
-- ====================================================
ALTER TABLE TIME
      ADD PRIMARY KEY (TIMEID);
ALTER TABLE COMPONENT
      ADD PRIMARY KEY (COMPONENTID);
ALTER TABLE USER
      ADD PRIMARY KEY (USERID);
```

-continued

```
ALTER TABLE SEVERITY
      ADD PRIMARY KEY (SEVERITYID);
ALTER TABLE STATE
      ADD PRIMARY KEY (STATEID);
ALTER TABLE RELEASE
      ADD PRIMARY KEY (RELEASEID);
ALTER TABLE ANSWER
      ADD PRIMARY KEY (ANSWERID);
ALTER TABLE DEFECTFACT
      ADD PRIMARY KEY (EXTRACTEDID, DEFECT_NUMBER);
-- =====================================================
-- Create Foreign Keys on DEFECT tables
-- =====================================================
ALTER TABLE DEFECTFACT
      ADD FOREIGN KEY (RELEASEID)
         REFERENCES RELEASE (RELEASEID) ON DELETE
         RESTRICT;
ALTER TABLE DEFECTFACT
      ADD FOREIGN KEY (COMPONENTID)
         REFERENCES COMPONENT (COMPONENTID) ON
         DELETE RESTRICT;
ALTER TABLE DEFECTFACT
      ADD FOREIGN KEY (ORIGINATORID)
         REFERENCES USER (USERID) ON DELETE RESTRICT;
ALTER TABLE DEFECTFACT
      ADD FOREIGN KEY (OWNERID)
         REFERENCES USER (USERID) ON DELETE RESTRICT;
ALTER TABLE DEFECTFACT
      ADD FOREIGN KEY (SEVERITYID)
         REFERENCES SEVERITY (SEVERITYID) ON DELETE
         RESTRICT;
ALTER TABLE DEFECTFACT
      ADD FOREIGN KEY (STATEID)
         REFERENCES STATE (STATEID) ON DELETE RESTRICT;
ALTER TABLE DEFECTFACT
      ADD FOREIGN KEY (ANSWERID)
         REFERENCES ANSWER (ANSWERID) ON DELETE
         RESTRICT;
ALTER TABLE DEFECTFACT
      ADD FOREIGN KEY (CREATIONID)
         REFERENCES TIME (TIMEID) ON DELETE RESTRICT;
ALTER TABLE DEFECTFACT
      ADD FOREIGN KEY (EXTRACTEDID)
         REFERENCES TIME (TIMEID) ON DELETE RESTRICT;
ALTER TABLE DEFECTFACT
      ADD FOREIGN KEY (LASTUPDATEID)
         REFERENCES TIME (TIMEID) ON DELETE RESTRICT;
ALTER TABLE DEFECTFACT
      ADD FOREIGN KEY (ASSIGNDATEID)
         REFERENCES TIME (TIMEID) ON DELETE RESTRICT;
ALTER TABLE DEFECTFACT
      ADD FOREIGN KEY (RESPONSEDATEID)
         REFERENCES TIME (TIMEID) ON DELETE RESTRICT;
ALTER TABLE DEFECTFACT
      ADD FOREIGN KEY (ENDDATEID)
         REFERENCES TIME (TIMEID) ON DELETE RESTRICT;
``` where the ALTER TABLE statement blocks define primary keys of the dimension tables 74, 76, 78, 80, 82, 84, 86 and the foreign keys the facts table 72 to provide suitable star schema joining of the dimension tables 74, 76, 78, 80, 82, 84, 86 with the facts table 72.

With continuing reference to FIG. 3, the cube model builder 32 further includes a dimensional data loading module 92 that generates and loads dimensional data into the dimension tables 74, 76, 78, 80, 82, 84, 86. In a preferred embodiment, a dimensional data generator 94 generates text files that contain the dimensional data, and a dimensional data loader 96 transfers the dimensional data from the text files into the dimension tables 74, 76, 78, 80, 82, 84, 86. Advantageously, this enables the dimensional data generator 94 to employ C++ or another general purpose programming language that can write to text files for computing the dimensional data.

With exemplary reference to the TIME dimension table 82, a text file containing time dimensional data is created by the dimensional data generator 94. The text file contains the time dimensional data as semicolon-delimited text with each entry of the form XXX;YYYY;QU;MO;WEEK;DAY, where the first field XXX is the primary key value, the second field YYYY is the year, the third field QU is the quarter, the fourth field MO is the month, the fifth field WEEK is the week of the month, and the last field DAY is the day of the month. A portion of such a text file for the date range Jan. 1, 2002 through Jan. 8, 2002 inclusive is shown below:

134;2002;1;01;1;01
135;2002;1;01;1;02
136;2002;1;01;1;03
137;2002;1;01;1;04
138;2002;1;01;1;05
139;2002;1;01;2;06
140;2002;1;01;2;07
141;2002;1;01;2;08 where the primary key value runs from 134 to 141 for the listed entries. The semicolon-delimited text file containing the time dimensional data is suitably created by a C++ program or other software component. Other semicolon-delimited text files can be similarly created to contain other dimensional data. For certain dimensions, the text file is suitably entered manually. For example, a text file containing dimensional data for loading into the ANSWER dimension table is set forth below:

1;as_designed;The program works as designed
2;deviation;Code or documentation will deviate from the standards
3;duplicate;This is duplicate of an existing defect
4;fixed;The problem is already fixed
5;future;Future releases or versions will address the defect
6;hardware_error;The problem is caused by a hardware error
7;info_needed;More information is required
8;limitation;The problem is a current limitation
9;suggestion;The is a suggestion, not an error
10;unrecreatable;The problem cannot be re_created
11;usage_error;The problem is caused by incorrect usage
12;program_defect;The problem was due to a program error
13;docs_defect;Documentation needs to be changed
14;docs_change;Documentation needs to be address new features
15;plans_change;Plans or schedules need to be changed
16;new_function;New function will be added
17;redesign;Current function needs to be redesigned
18;fix_testcase;Testcase needs to be fixed
19;remove_code;Obsolete code needs to be removed
20;remove_support;Nonsupported functions need to be removed
21;comply_with;Coding practices and operation needs to comply with standards
22;no_answer;Defect is either in open or canceled state where the data is in the form XX;NNNN;DDDD in which XX is the primary key value, NNNN is an answer identifier field, and DDDD is a text description field that describes the answer in more detail. Since the text file containing the ANSWER dimensional data is relatively short, and is not particularly suitable for generation by an automated algorithm, the text file containing the ANSWER dimensional data is preferably typed in manually rather than being generated algorithmically by the data generator 94.

With continuing reference to FIG. 3, the dimensional data contained in the various semicolon-delimited text files that are created manually or by the dimensional data generator 94 are loaded into the dimension tables 74, 76, 78, 80, 82, 84, 86 by the dimensional data loader 96. In a suitable embodiment, the dimensional data loader 96 is embodied by the following exemplary DDL script:

SET CURRENT SCHEMA=DEFECT;
  Load data into DEFECT tables
IMPORT FROM COMPONENT.txt OF DEL MODIFIED BY COLDEL; INSERT INTO COMPONENT;
IMPORT FROM USER.txt OF DEL MODIFIED BY COLDEL; INSERT INTO USER;
IMPORT FROM SEVERITY.txt OF DEL MODIFIED BY COLDEL; INSERT INTO SEVERITY;
IMPORT FROM STATE.txt OF DEL MODIFIED BY COLDEL; INSERT INTO STATE;
IMPORT FROM RELEASE.txt OF DEL MODIFIED BY COLDEL; INSERT INTO RELEASE;
IMPORT FROM ANSWER.txt OF DEL MODIFIED BY COLDEL; INSERT INTO ANSWER;
IMPORT FROM TIME.txt OF DEL MODIFIED BY COLDEL; INSERT INTO TIME;
IMPORT FROM DEFECTFACT.txt OF DEL MODIFIED BY COLDEL; INSERT INTO DEFECTFACT;

where, for example, TIME.txt is the semicolon-delimited text file containing the time dimensional data, ANSWER.txt is the text file containing the answer dimensional data, and so forth, and the object of each "INSERT INTO" clause identifies the dimension table to be loaded.

The DEFECTFACT.txt file referenced in the above DDL script is suitably created by the ETL tool 36 using a custom-written C++ or other program that extracts data from the defect tracking databases 10, 12, the project management tools 14, and optionally other sources, and transforms the data into semicolon-delimited data which is written to the text file DEFECTFACT.txt. The last IMPORT command of the above script then loads data from the DEFECTFACT.txt file into the defects facts table 72.

The described cube model builder 32 is exemplary only. Those skilled in the art can readily modify the described components or substitute other components for building specific metadata tables with specific dimensions and entity relationship schema. For example, rather than semicolon-delimited text files, other data formats can be used which can be imported into the interrelated tables 22 by DDL scripts or the like.

Moreover, although the dimensional data loading module 92 is shown in FIG. 3 as a component of the cube model builder 32, it can also optionally be accessed by the ETL tool 36 to update the dimension tables during refreshing of the defects data. In one preferred embodiment, when a cube model refresh operation is triggered by the data refresh trigger 40, in addition to the ETL 36 updating the facts table 72, the various dimension tables 74, 76, 78, 80, 82, 84, 86 are also updated by the dimensional data loading module 92. However, since certain dimensional data is expected to remain static across refreshes, these data are optionally not updated. For example, the ANSWER.txt dimensional data typically does not change once it is set up, and so the ANSWER dimension table 84 is preferably not updated at each refresh. Moreover, the dimensional data loading module 92 can advantageously perform checks to determine whether dimensional data already stored in the dimension tables 74, 76, 78, 80, 82, 84, 86 has changed, and thus limit updating to new, deleted, or modified dimensional content. Similarly, the ETL 36 can perform checks to limit updating of defects entries to new, deleted, or modified defect entries.

With returning reference to FIG. 1, the multidimensional defects metadata cube model 30 is accessed by the SQL engine 50 in accordance with SQL statements generated by the OLAP cube builder 46 to generate the one or more OLAP cubes 54, 56 for analysis. In one arrangement, the OLAP cube builder 46 is embodied as a distinct software component that is accessed by project engineers to generate OLAP cubes for detailed analysis by end users. In another arrangement, the OLAP cube builder 46 is integrated into the add-in OLAP presentation tool 60 that is accessed by the end user, so that the end user directly generates the OLAP cubes 54, 56 as part of the end user's analyses. Various combinations of integrated and discrete cube builder components are also contemplated.

To generate the OLAP cubes 54, 56, cube dimensions are selected. For dimensions with a plurality of possible hierarchies, a hierarchy for each selected dimension is also selected. For example, if the CREATEDATE dimension is selected as a dimension of an OLAP cube, one suitable hierarchy selection is: {year, month, day}. Within this hierarchy, a user can drill down to assess defect data by year, month, or day. Alternatively, another suitable hierarchy selection is: {year, week}, which allows data to be assessed by year or by week.

With continuing reference to FIG. 1 and with further reference to FIG. 4, OLAP cubes 54, 56 are analyzed by the spreadsheet 18 using the add-in OLAP presentation tool 60. FIG. 4 shows an exemplary screenshot 100 showing such an analysis. A drop-down component selector icon 102 operable by a mouse or other pointing device is used to select a component of the software development for analysis. The component dimension table 74 identifies the components which can be selected. In the screenshot 100, a spreadsheet region 104 shows a data tabulation using a severity dimension 106 and a state dimension 108. A rightmost column 110 shows the defect counts for this two-dimensional matrix. Moreover, the OLAP presentation tool 60 provides a selection region 112 that includes other dimensions such as "Owner", "Originator", "CreateDate", and so forth, which are selectable by the end user via the mouse or other pointing device. Selecting, for example, "CreateDate" using the mouse will cause the spreadsheet region 104 to display a newly dimensioned matrix that includes as a dimension the defect entry creation date.

Figure 5:
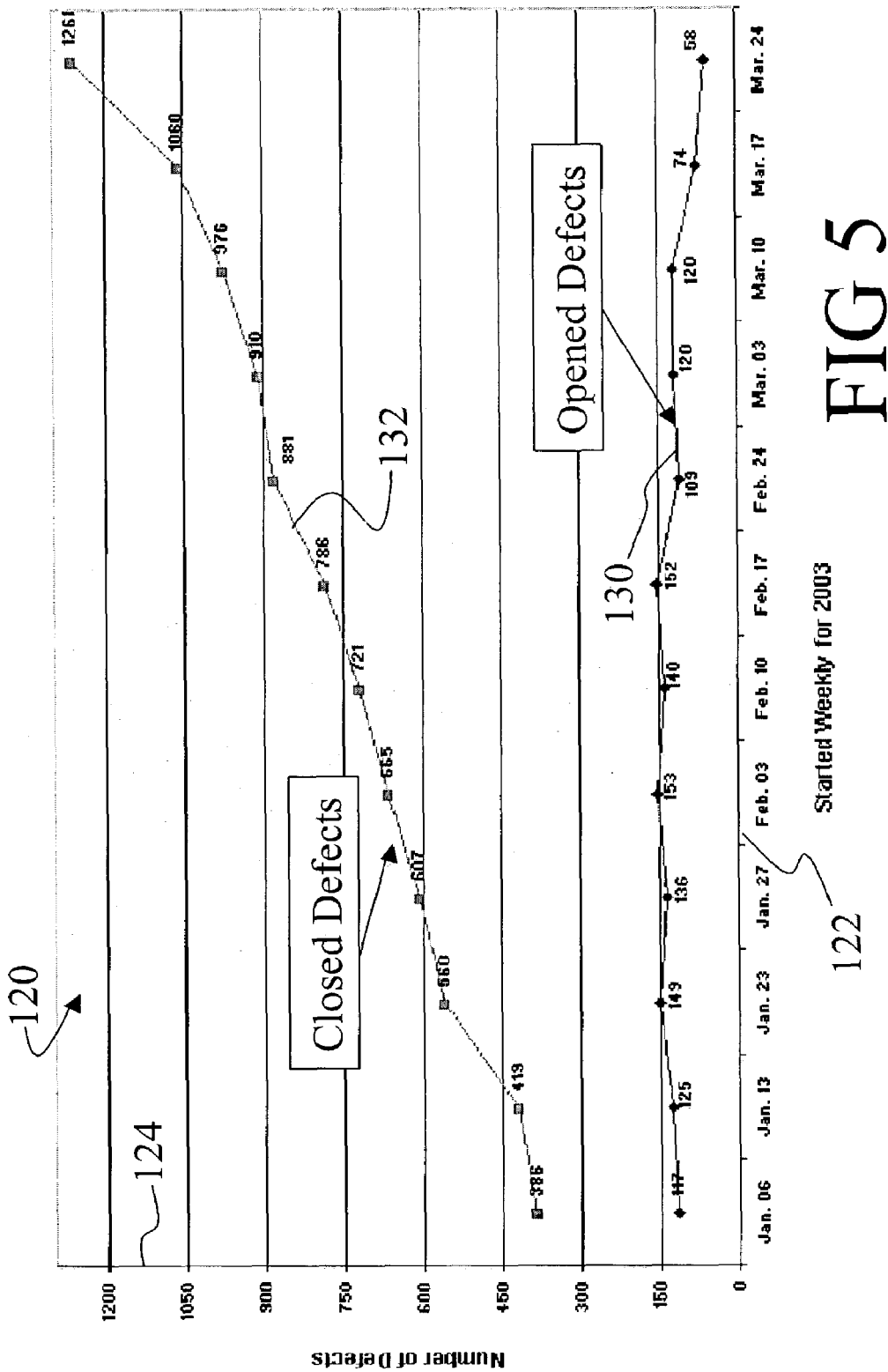
FIG. 5 shows an exemplary plot generated using the spreadsheet with add-in OLAP presentation tool of the analysis system of FIG. 1.

With continuing reference to FIG. 1 and with further reference to FIG. 5, an exemplary plot 120 generated by the spreadsheet program 18 in conjunction with the add-in OLAP presentation tool 60 is shown. A plot abscissa 122 is indexed by week, and an ordinate coordinate 124 is a total number of defects opened or closed. A first curve 130 corresponds to total number of opened defects, and is seen to be generally level during January and February, and generally decreasing during March, as a function of week. A second curve 132 corresponds to total number of closed defects, and is seen to be increasing as a function of week as identified defects are remedied.

When the defect data is extracted and put into the defect fact table 72 the date of the extraction is included in the EXTRACTEDID column. At any point in the future this snapshot of the defect data can be analyzed. As an example, FIG. 5 shows that there were 136 open defects on January 27th. For any snapshot a complete analysis of defects can be done by severity, component, owner, or other stored data. Furthermore, comparisons can be done across time. FIG. 5 compares the number of open and closed defects week by week. The data shown for each week is from a snapshot of the defect data taken that week. Snapshots can be taken at suitable time intervals to provide a desired temporal resolution for analyzing the data. In a contemplated approach, daily or weekly snapshots are extracted.

The spreadsheet screenshot 100 of FIG. 4 and the plot 120 of FIG. 5 are exemplary only. Those skilled in the art can readily generate otherwise-dimensioned matrices and plots using the described spreadsheet program 18 in conjunction with the add-in OLAP presentation tool 60. Moreover, those skilled in the art can readily substitute other general purpose analysis programs in place of the exemplary spreadsheet program 18.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An apparatus including a program storage medium readable by a computer for processing data relating to software defects, the apparatus operative within an associated on-line analytical processing environment that includes at least an on-line analytical processing presentation tool for presenting results of on-line analytical processing, the apparatus comprising:

an on-line analytical processing cube model builder for building a plurality of interrelated tables with on-line analytical processing cube model metadata, the on-line analytical processing cube model metadata defining a cube model that represents a structural relationship between said plurality of interrelated tables, and the metadata including at least one on-line analytical processing metadata object defining a measurement entity operative in conjunction with a dimensional context, the measurement entity including at least one of a defect count measure defined in eXtensible Markup Language (XML) and a defect count average measure defined in XML, the tables including at least a defect facts table containing software defects entries corresponding to said data relating to software defects and a plurality of dimension tables, the defect facts table being interrelated with the plurality of dimension tables by a facts and dimensions table builder, the cube model including the software defects entries being configured to be processed by the associated on-line analytical processing presentation tool by means of an on-line analytical processing cube generated from said software defects entries in said cube model based on selected metadata in the plurality of dimension tables, said metadata categorizing at least one set of related attributes that together describe an aspect of at least one dimension measure corresponding to said software defects entries; and a data extraction tool communicating with a defect tracking database containing said data relating to software defects, the data extraction tool extracting said data from the defect tracking database, transforming the extracted data into the software defect entries, and loading the software defect entries into the defect facts table.

2. The apparatus as set forth in claim 1, wherein the plurality of dimension tables include:

a time dimension table storing year, month, and day dimensional data and at least one of week dimensional data and quarter dimensional data.

3. The apparatus as set forth in claim 2, wherein the fact table is joined to the time dimension table.

4. The apparatus as set forth in claim 1, wherein:

the data extraction tool is adapted to communicate with a project management tool to extract data pertaining to identified software defects therefrom; and the data data extraction tool is adapted to incorporate the data extracted from the project management tool into the software defect entries.

5. The apparatus as set forth in claim 1, further including:

an on-line analytical processing cube builder accessing the on-line analytical processing cube model metadata and constructing said on-line analytical processing cube having selected dimensions from the cube model.

6. The apparatus as set forth in claim 5, wherein the on-line analytical processing cube builder is integrated with the presentation tool.

7. The apparatus as set forth in claim 1, wherein:

the data extraction tool is responsive to a data refresh trigger to update software defect entries in the defects fact table and metadata in the on-line analytical processing cube model at selected times.

8. The apparatus as set forth in claim 1, wherein the on-line analytical processing cube model builder includes:

a tables builder for building the defects fact table and the plurality of dimension tables; and a dimensional data loader for loading dimensional data into the dimension tables.

9. The apparatus as set forth in claim 8, wherein the on-line analytical processing cube model builder further includes:

a dimensional data generator for generating at least some of the dimensional data loaded by the dimensional data loader.

10. The apparatus as set forth in claim 9, wherein the dimensional data generator outputs a text file containing dimensional data.

11. The apparatus as set forth in claim 1, wherein the on-line analytical processing cube model metadata conforms with a standardized general purpose metadata specification, and the on-line analytical processing presentation tool is operable with the standardized general purpose metadata specification.

12. The apparatus as set forth in claim 1, wherein said defect count measure is defined in XML as:

–<measure name="DEFECT COUNT" schema="DEFECT" BusinessName="DEFECT COUNT" createTime="year-mo-date T hr:min:sec" creator="ARBOR" modifyTime="year-mo-date T hr:mm:sec" modifier="ARBOR">
<datatype schema="SYSIBM" name="INTEGER" length="4" scale="0"/>
–<sqlExpression template="{$$1}">
<column name="AGE" tableSchema="DEFECT" tableName="DEFECTFACT" />
</sqlExpression>
<aggregation function="COUNT" />
</measure> where tableSchema="DEFECT" references said interrelated tables and tableName=DEFECTFACT references said defect facts table.

13. The apparatus as set forth in claim 1, wherein said defect count average measure is defined in XML as:

–<measure name="DEFECT COUNT AVERAGE" schema="DEFECT" businessName="DEFECT COUNT AVERAGE" createTime="year-mo-date T hr:min:sec" creator="ARBOR" modifyTime="year-mo-date T hr:min:sec" modifier="ARBOR">
<datatype schema="SYSIBM" name="INTEGER" length="4" scale="0"/>
<sqlExpression template="1"/>

```
<aggregation function="COUNT">
<dimensionRef name="Variable1" schema="DEFECT"
    />
    .
    .
    .
<dimensionRef name="VariableN" schema="DEFECT"
    />
</aggregation>
<aggregation function=AVG" />
</measure>
```
where schema="DEFECT" references said interrelated tables and dimensionRef name="Variable1" . . . dimensionRef name="VariableN" references said defect facts table.

14. The apparatus as set forth in claim 1, wherein the at least one on-line analytical processing object is operative to perform at least a count of the number of software defects entries in at least one dimension and an average of the number of software defects.

15. The apparatus as set forth in claim 1, wherein the facts and dimensions table builder is described via a series of data definition language (DDL) commands.

16. The apparatus as set forth in claim 1, wherein said measurement entity operative in conjunction with said dimensional context includes at least one of an estimated duration measure, a days completed measure, a task completed measure, a remaining effort in days measure, and a defect count by weeks measure.

17. A method for processing data on software, the method comprising:
   formatting information pertaining to identified software defects and loading the formatted information as defect entries into a defects database;
   constructing a multidimensional on-line analytical processing cube model associated with the defects database, the cube model including metadata for at least a plurality of time dimensions, and including at least one on-line analytical processing metadata object defining a measurement entity operative in conjunction with a dimensional context, the measurement entity including at least one of a defect count measure defined in XML and a defect count average measure defined in XML;
   constructing an on-line analytical processing cube based on the defects database, the cube model, and cube dimensions selected from the dimensions included in the cube model; and
   accessing the on-line analytical processing cube using an on-line analytical processing presentation tool.

18. The method as set forth in claim 17, wherein the constructing of an on-line analytical processing cube includes:
   for at least one selected cube dimension, selecting a hierarchy of the selected dimension.

19. The method as set forth in claim 17, wherein the constructing of a multidimensional on-line analytical processing cube model includes:
   generating a plurality of tables including at least a fact table and a plurality of dimension tables;
   joining at least some columns of the fact table with dimension tables; and
   loading dimensional data into the dimension tables.

20. The method as set forth in claim 19, wherein the constructing of a multidimensional on-line analytical processing cube model further includes:
   generating at least some of the dimensional data algorithmically.

21. The method as set forth in claim 17, wherein the accessing of the on-line analytical processing cube using an on-line analytical processing presentation tool includes:
   selecting dimensions of the cube for display; and
   displaying a tabulation of cube contents, the tabulation having the selected dimensions.

22. The method as set forth in claim 17, wherein the accessing of the on-line analytical processing cube using an on-line analytical processing presentation tool includes:
   selecting one of the cube dimensions as an abscissa dimension; and
   plotting a measure of the on-line analytical processing cube versus the abscissa dimension.

23. The method as set forth in claim 17, further including:
   prior to the formatting of information pertaining to identified software defects, extracting the information pertaining to identified software defects from a defect tracking database.

24. The method as set forth in claim 17, further including:
   prior to the formatting of information pertaining to identified software defects, extracting the information pertaining to identified software defects from at least one of a defect tracking database and a project management tool.

25. The method as set forth in claim 17, wherein the formatting of information pertaining to identified software defects and loading the formatted information as defect entries into a defects database includes:
   associating an extract date with each defect entry, the extract date indicating when the defect entry was read from an associated data source.

26. The method as set forth in claim 25, wherein the constructing of an on-line analytical processing cube based on the defects database, the cube model, and a selection of cube dimensions includes:
   selecting the extract date as a cube dimension.

27. The method as set forth in claim 26, wherein the accessing of the on-line analytical processing cube using an on-line analytical processing presentation tool includes:
   slicing, dicing, or drilling through the on-line analytical processing cube using the extract date dimension to present a temporal snapshot of the defects data.

28. The method as set forth in claim 17, wherein said defect count measure is defined in XML as:
```
-<measure name="DEFECT COUNT"
    schema="DEFECT" BusinessName="DEFECT
    COUNT" createTime="year-mo-date T hr:min:sec"
    creator="ARBOR" modifyTime="year-mo-date T
    hr:mm:sec" modifier="ARBOR">
<datatype schema="SYSIBM" name="INTEGER"
    length="4" scale="0"/>
-<sqlExpression template="{$$1}">
<column name="AGE" tableSchema="DEFECT"
    tableName="DEFECTFACT" />
</sqlExpression>
<aggregation function="COUNT" />
</measure>
```
where tableSchema="DEFECT" references a plurality of interrelated tables of said defects database, and tableName=DEFECTFACT references a defect facts table of said plurality of interrelated tables.

29. The method as set forth in claim 17, wherein said defect count average measure is defined in XML as:
```
-<measure name="DEFECT COUNT AVERAGE"
    schema="DEFECT" businessName="DEFECT
    COUNT AVERAGE" createTime="year-mo-date T
    hr:min:sec" creator="ARBOR" modifyTime="year-
    mo-date T hr:min:sec" modifier="ARBOR">
```

```xml
<datatype schema="SYSIBM" name="INTEGER" length="4" scale="0"/>
<sqlExpression template="1"/>
<aggregation function="COUNT">
<dimensionRef name="Variable1" schema="DEFECT"/>
.
.
.
<dimensionRef name="VariableN" schema="DEFECT"/>
</aggregation>
<aggregation function=AVG" />
</measure>
```
where schema="DEFECT" references a plurality of interrelated tables of said defects database, and dimensionRef name="Variable1" . . . dimensionRef name="VariableN" references a defect facts table of said plurality of interrelated tables.

30. The method as set forth in claim 17, wherein the at least one on-line analytical processing objects is operative to perform at least a count of the number of software defects entries in at least one dimension and an average of the number of software defects.

31. The method as set forth in claim 17, wherein the constructing a multidimensional on-line analytical processing cube model further comprises describing a facts and dimensions table builder via a series of data definition language (DDL) commands.

32. The method according to claim 17, wherein said constructing includes constructing the cube model and said measurement entity includes at least one of an estimated duration measure, a days completed measure, a task completed measure, a remaining effort in days measure, and a defect count by weeks measure.

33. An article of manufacture comprising a program storage medium readable by a computer and embodying one or more instructions executable by the computer to perform a method for processing data on identified software defects, the method comprising:
constructing a multidimensional on-line analytical processing cube model representing a structural relationship between a plurality of interrelated tables, the cube model including at least a plurality of time dimensions and at least one on-line analytical processing metadata object defining a measurement entity operative in conjunction with a dimensional context, the measurement entity including at least one of a defect count measure defined in XML and a defect count average measure defined in XML;
generating a multidimensional on-line analytical processing cube having dimensions containing information pertaining to identified software defects, the cube generated based on selected metadata in the on-line analytical processing cube model categorizing at least one set of related attributes that together describe an aspect of at least one of said dimensions; and
accessing the on-line analytical processing cube using an on-line analytical processing presentation tool.

34. The article of manufacture as set forth in claim 33, wherein the generating of an on-line analytical processing cube includes:
formatting information pertaining to identified software defects and storing the formatted information as defect entries associated with the cube model; and
constructing the on-line analytical processing cube based on the stored defect entries, the cube model, and selected cube dimensions.

35. The article of manufacture as set forth in claim 34, wherein the formatting of information pertaining to identified software defects and storing the formatted information as defect entries associated with the cube model includes:
extracting the information pertaining to identified software defects at selected times; and
during the formatting of defect entries, tagging each defect entry with at least one of an extraction date value and an extraction time value.

36. The article of manufacture as set forth in claim 35, wherein the selected cube dimensions of the on-line analytical processing cube include an extraction time dimension, and the accessing of the on-line analytical processing cube using an on-line analytical processing presentation tool includes:
plotting a cube dimension other than the extraction time dimension against the extraction time dimension.

37. The article of manufacture as set forth in claim 33, wherein the accessing of the on-line analytical Processing cube includes:
communicating selected portions of said information pertaining to the identified software defects from the on-line analytical processing presentation tool to a spreadsheet program; and
displaying one of a tabulation and a plot of the communicated selection portions using the spreadsheet program.

38. The article of manufacture as set forth in claim 33, wherein said defect count measure is defined in XML as:
```xml
-<measure name="DEFECT COUNT" schema="DEFECT" BusinessName="DEFECT COUNT" createTime="year-mo-date T hr:min:sec" creator="ARBOR" modifyTime="year-mo-date T hr:mm:sec" modifier="ARBOR">
<datatype schema="SYSIBM" name="INTEGER" length="4" scale="0"/>
-<sqlExpression template="{$$1}">
<column name="AGE" tableSchema="DEFECT" tableName="DEFECTFACT" />
</sqlExpression>
<aggregation function="COUNT" />
</measure>
```
where tableSchema="DEFECT" references said interrelated tables and dimensionRef="Variable1" . . . dimensionRef="VariableN" references a defect facts table of the interrelated tables.

39. The article of manufacture as set forth in claim 33, wherein said defect count average measure is defined in XML as:
```xml
<measure name="DEFECT COUNT AVERAGE" schema="DEFECT" businessName="DEFECT COUNT AVERAGE" createTime="year-mo-date T hr:min:sec" creator="ARBOR" modifyTime="year-mo-date T hr:min:sec" modifier="ARBOR">
<datatype schema="SYSIBM" name="INTEGER" length="4" scale="0"/>
<sqlExpression template="1"/>
<aggregation function="COUNT">
<dimensionRef name="Variable1" schema="DEFECT"/>
.
.
.
<dimensionRef name="VariableN" schema="DEFECT"/>
```

```
</aggregation>
<aggregation function=AVG" />
</measure>
```
where schema="DEFECT" references said interrelated tables and dimensionRef name="Variable1" . . . dimensionRef name="VariableN" references a defect facts table of said plurality of interrelated tables.

40. The article of manufacture as set forth in claim 33, wherein the at least one on-line analytical processing object is operative to perform at least a count of the number of software defects entries in at least one dimension and an average of the number of software defects.

41. The article of manufacture as set forth in claim 33, wherein the method for processing data on identified software defects further comprises describing a facts and dimensions table builder via a series of data definition language (DDL) commands.

42. The article of manufacture as set forth in claim 33 further comprising constructing said cube model including said metadata object comprising at least one of an estimated duration measure, a days completed measure, a task completed measure, a remaining effort in days measure, and a defect count by weeks measure.

\* \* \* \* \*